US011148539B2

(12) United States Patent
Krogh et al.

(10) Patent No.: US 11,148,539 B2
(45) Date of Patent: *Oct. 19, 2021

(54) MULTI-FUNCTIONAL VEHICLE CHARGING APPARATUS AND SYSTEM

(71) Applicant: Tru-Lock Technologies LLC, Charleston, SC (US)

(72) Inventors: Kathryn Truluck Krogh, Charleston, SC (US); Ashley Wilson Truluck, Charleston, SC (US); Brad D. Smith, Charleston, SC (US)

(73) Assignee: Tru-Lock Technologies LLC, Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,378

(22) Filed: Apr. 7, 2020

(65) Prior Publication Data

US 2020/0231051 A1 Jul. 23, 2020

Related U.S. Application Data

(63) Continuation-in-part of application No. 15/793,540, filed on Oct. 25, 2017, now Pat. No. 10,615,554.

(Continued)

(51) Int. Cl.
*G06F 21/00* (2013.01)
*B60L 53/16* (2019.01)
*H02J 7/00* (2006.01)
*B60L 53/30* (2019.01)
*B60L 53/66* (2019.01)

(Continued)

(52) U.S. Cl.
CPC ............. *B60L 53/16* (2019.02); *B60L 53/305* (2019.02); *B60L 53/65* (2019.02); *B60L 53/66* (2019.02); *G06F 21/44* (2013.01); *G06F 21/45* (2013.01); *G06F 21/70* (2013.01); *G06F 21/82* (2013.01);

(Continued)

(58) Field of Classification Search
CPC ........ G06F 31/30; G06F 31/44; G06F 31/445; G06F 31/45; G06F 31/50; G06F 31/70; G06F 31/81; G06F 31/82; G06F 31/85; G06F 21/30; G06F 21/44; G06F 21/445; G06F 21/45; G06F 21/50; G06F 21/70; G06F 21/81; G06F 21/82; G06F 21/85;

(Continued)

(56) References Cited

U.S. PATENT DOCUMENTS

2010/0231163 A1\* 9/2010 Mashinsky ............. H02J 50/12
320/108
2016/0373408 A1\* 12/2016 Wentworth ......... G06F 13/4068

\* cited by examiner

*Primary Examiner* — Edward Zee
(74) *Attorney, Agent, or Firm* — Gregory Finch; Finch Paolino, LLC

(57) ABSTRACT

A multi-functional cord that can be used in connection with one or more user devices specified by a user associated with the cord. The user may program the multi-functional cord to enable the multi-functional cord to operate in a particular manner when associated with a first user device and may preclude the multi-functional cord from operating when associated with a second user device. The multi-functional cord may also, or alternatively, be pre-programmed to work with a particular user device, such as, in a non-limiting example, when the multi-functional cord is sold with the user device. Certain aspects of the present disclosure provided may be implemented within electric vehicle charging systems and electric vehicle supply equipment comprising wired and wireless power and data interfaces.

20 Claims, 10 Drawing Sheets

Related U.S. Application Data

(60) Provisional application No. 62/413,063, filed on Oct. 26, 2016.

(51) Int. Cl.
| | |
|---|---|
| *B60L 53/65* | (2019.01) |
| *G06F 21/82* | (2013.01) |
| *G06F 21/44* | (2013.01) |
| *G06F 21/45* | (2013.01) |
| *G06F 21/70* | (2013.01) |
| *G06F 21/85* | (2013.01) |

(52) U.S. Cl.
CPC ............ *G06F 21/85* (2013.01); *H02J 7/0045* (2013.01); *H02J 7/00045* (2020.01)

(58) Field of Classification Search
CPC ........ B60L 53/16; B60L 53/66; B60L 53/305; B60L 53/65; H02J 7/00045; H02J 7/0045
See application file for complete search history.

MULTI-FUNCTIONAL VEHICLE CHARGING APPARATUS AND SYSTEM

CROSS-REFERENCE TO RELATED APPLICATIONS

This application is a continuation-in-part of U.S. patent application Ser. No. 15/793,540 filed Oct. 25, 2017 and titled "MULTI-FUNCTIONAL CORD APPARATUS AND SYSTEM," which claims the benefit of U.S. Provisional Application No. 62/413,063, filed on Oct. 26, 2016; the disclosures of which are hereby incorporated in their entireties at least by reference.

FIELD

The present disclosure relates to the field of power and data interfaces for electric vehicles; in particular, a multi-functional vehicle charging interface that can be selectively restricted for use with one or more vehicles as specified by an administrative user.

BACKGROUND

Some modern vehicles are configured to run the vehicle's powertrain off of electrical power. Such vehicles are propelled by an electric motor (or motors) that are powered by rechargeable power sources (e.g., battery packs). Electric motors have several advantages over internal combustion engines. For example, electric motors may convert about 75% of the chemical energy from the batteries to power the wheels, whereas internal combustion engines are considerably less efficient. EVs emit no tailpipe pollutants when operating in battery mode. Electric motors provide quiet, smooth operation, strong acceleration and require relatively low maintenance. For at least these reasons, hybrid electric and electric vehicles have become increasingly popular.

However, most current electric vehicles can only go about 100-200 miles before requiring electrical recharging. Fully recharging an electric vehicle's battery pack may take about 4 to 8 hours. Even a quick charge to about 80% capacity can take about 30 minutes. Furthermore, as battery pack size increases, so does the corresponding charging time. Electric vehicle charging may take place at the owner's residence using electric vehicle supply equipment, commonly referred to as an electric vehicle charging station. Electric vehicle supply equipment may include a charging cable connected to an A/C or D/C power source, as well as wireless charging equipment comprising components such as a power source resonator and a power capture resonator. In addition to providing power to electric vehicles, electric vehicle supply equipment often enables data transfer interface between the vehicle's on-board computer and one or more external computing devices.

Such electric vehicle supply equipment may be installed at a residence (e.g., in a garage), such as on an inside or outside wall, post or other structure, and may be electrically coupled to an electrical load center of the residence. As the prevalence of such vehicles increase, there will be an ever increasing need to ensure the integrity and security of electric vehicle supply equipment across multiple users and electric vehicles.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

An object of the present disclosure is a programmable cord for mobile electronic devices that can be used for data transfer, charging, or for security (e.g., firewall, authentication, etc.).

Another object of the present disclosure is a smart charging cord via which electrical power signals, and/or electrical and/or optical communication signals can be transmitted and can be programmed to be assigned to a single device or multiple devices.

Another object of the present disclosure is a smart charging cord that may be preprogrammed (e.g., during manufacture, during packaging with a user device, etc.) to store information associated with a user device with which the cord is associated. Alternatively, the smart charging cord may be purchased separately and programmed using a mobile application to associate the smart charging cord with the user device.

Another object of the present disclosure is a smart charging cord mobile application that is downloadable to a user device and operable to program a smart charging cord controller to associate the cord with the user device and/or other authorized devices. The mobile application may enable the user device to communicate with the cord via a wired or wireless communications interface. The mobile application may be used to program the cord to permit data transfer, charging and security functionality when connected to multiple devices. The mobile application may enable the user device to be able to track the location of the cord (using GPS or WiFi) in the event it is misplaced. The smart cord may authenticate based on the user device information or user information or based on time or geographic location.

Another object of the present disclosure is a smart charging cord that selectively enables a user device to selectively restrict power or communication signals from traveling to or from a non-authenticated power source, data source or user device. The cord may store and execute instructions that block transmission of packets and/or traffic received from non-authenticated devices and/or IP addresses from being transmitted to the user device. The cord may store and execute instructions to identify when malicious software has been detected, and/or when an electronic attack has been initiated and/or is underway and prevent transmission to the user device.

Certain embodiments of the present disclosure include an electric vehicle charging system comprising a first connector configured to operably interface with an on-board charger of an electric vehicle to selectively deliver power and/or data to the electric vehicle; a second connector configured to selectively receive power and/or data from a power source and/or a data source; and, a controller operably engaged with the first connector and the second connector and configured to selectively control and restrict a flow of power and/or data between the first connector and the second connector, the controller comprising a processor; and a non-transitory computer readable medium having stored thereon a set of instructions executable by the processor that, when executed, cause the processor to perform the one or more operations, the one or more operations comprising receiving a user-generated input from an administrator computing device associated with an administrative user of an electric vehicle charging application; configuring, in response to the user-generated input, the electric vehicle as an administrator vehicle; authorizing the administrator vehicle to receive a full functionality of available services of the controller, wherein the full functionality of available services comprises administrative rights; configuring and authorizing a non-administrator vehicle to receive a functionality of available services of the controller based on one or more transfer permissions defining a selective transmission of power or data between the first connector and the second connector, the one or more transfer permissions being configurable by the administrator computing device, wherein the functionality of available services authorized for the non-administrator vehicle does not comprise the administrative rights; and authenticating the power source or the data source associated with the second connector, wherein the electronics module is configured to disable the transmission of power and/or data between the first connector and the second connector to the non-administrator vehicle and enable the transmission of power and/or data between the first connector and the second connector to the administrator vehicle, in accordance with the one or more transfer permissions.

Certain embodiments of the present disclosure include an electric vehicle charging system comprising a first transfer interface comprising a power capture resonator operably engaged with an on-board charger of an electric vehicle, the first transfer interface being configured to wirelessly receive a power and/or data transmission; a second transfer interface comprising a power source resonator configured to selectively receive power and/or data from a power source and/or data source and wirelessly transmit a power and/or data transmission to the first transfer interface; and a controller communicably engaged with the first transfer interface and/or the second transfer interface and configured to enable or restrict one or more functions of the first transfer interface and/or the second transfer interface in response to one or more control settings, the controller comprising a processor; and a non-transitory computer readable medium having stored thereon a set of instructions executable by the processor that, when executed, cause the processor to perform the one or more operations, the one or more operations comprising receiving, via an input-output device communicably engaged with the controller, a user-generated input associated with an administrative user of an electric vehicle charging application; configuring, in response to the user-generated input, the electric vehicle as an administrator vehicle; authorizing the administrator vehicle to receive a full functionality of available services of the controller, wherein the full functionality of available services comprises administrative rights; and configuring and authorizing a non-administrator vehicle to receive a functionality of available services of the controller based on one or more transfer permissions defining a selective transmission of power and/or data between the first transfer interface and the second transfer interface, the one or more transfer permissions being configurable by the administrator computing device, wherein the functionality of available services authorized for the non-administrator vehicle does not comprise the administrative rights; wherein the controller is configured to disable the transmission of power and/or data to the non-administrator vehicle and enable the transmission of power and/or data to the administrator vehicle, in accordance with the one or more transfer permissions.

Further embodiments of the present disclosure include an electric vehicle charging system comprising a first connector configured to selectively deliver power and/or data to an electric vehicle; a second connector configured to selectively receive power and/or data from a power source and/or a data source and deliver the power and/or data to the first connector via at least one transfer interface; a controller operably engaged with the first connector or the second connector and configured to selectively control a flow of power and/or data between the first connector and the second connector according to one or more control settings; and a computing device communicably engaged with the controller to selectively configure the one or more control settings via a user application executing on the computing device, wherein the one or more control settings comprise configuring the electric vehicle as an administrator vehicle or a non-administrator vehicle; authorizing the administrator vehicle to receive a full functionality of available services of the controller, wherein the full functionality of available services comprises administrative rights; configuring and authorizing at least one non-administrator vehicle to receive a functionality of available services of the controller based on one or more transfer permissions defining a selective transmission of power or data between the first connector and the second connector, wherein the functionality of available services authorized for the non-administrator vehicle does not comprise the administrative rights; and authenticating the electric vehicle as the administrator vehicle or the at least one non-administrator vehicle, wherein the controller is configured to selectively restrict the transmission of power and/or data between the first connector and the second connector to the non-administrator vehicle and enable the transmission of power and/or data between the first connector and the second connector to the administrator vehicle, in accordance with the one or more control settings.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. The above and other objects, features and advantages of the present disclosure will be more apparent from the following detailed description taken in conjunction with the accompanying drawings, in which.

DETAILED DESCRIPTION

Figure 1:
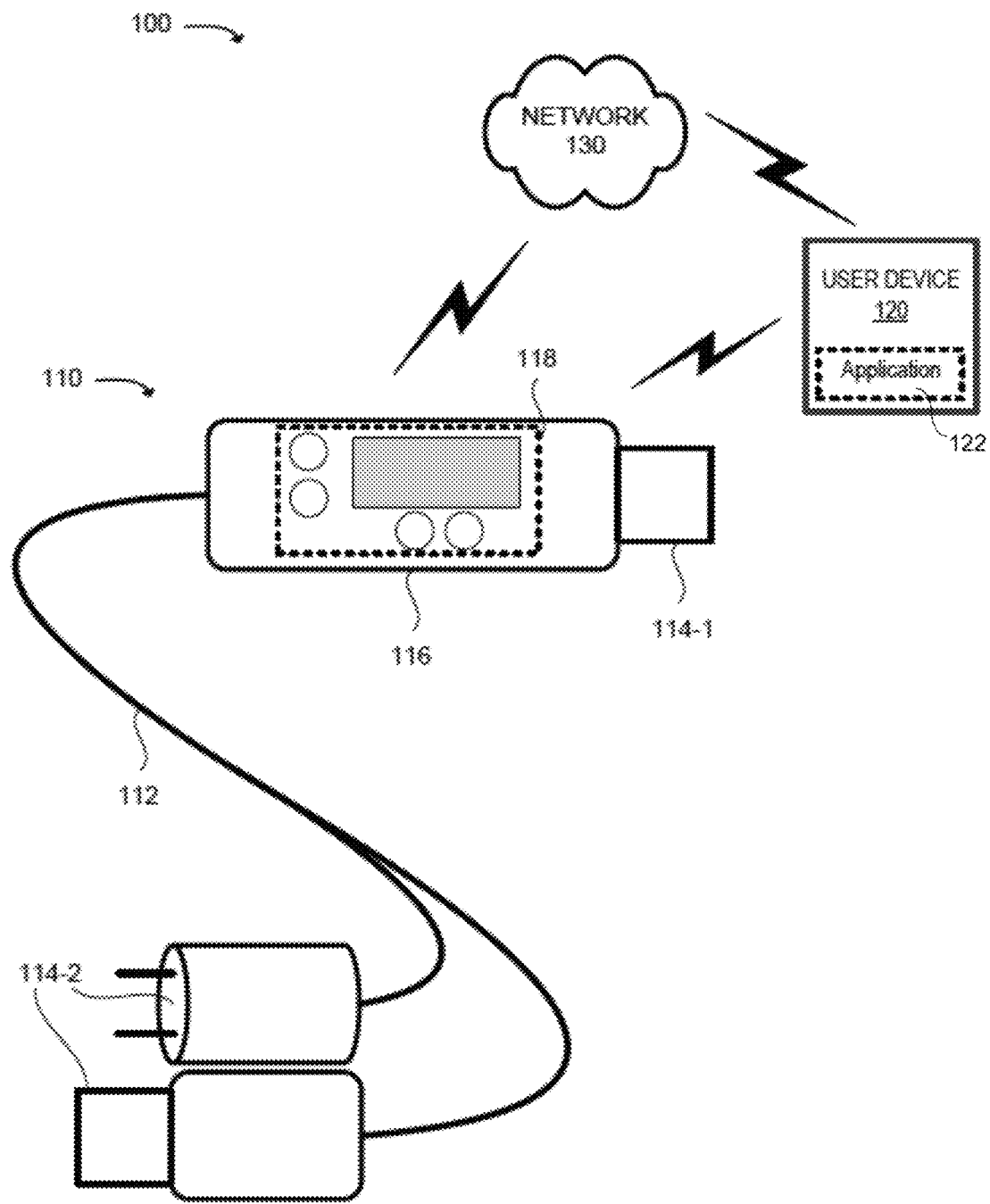
FIG. 1 illustrates a diagram of an example environment in which the systems, methods, and/or devices described herein may be implemented.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, devices and systems configured to provide for electric vehicle charging systems and electric vehicle supply equipment comprising wireless and wireless power and data interfaces.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "packet" refers to any formatted unit of data that may be sent and/or received by an electronic device.

As used herein, the term "payload" refers to any part of transmitted data that constitutes an intended message and/or identifying information.

As used herein, the term "interface" refers to any shared boundary across which two or more separate components of an electronic system that may exchange information, power and/or communications signals. The exchange can be between software, computer hardware, peripheral devices, humans, and combinations thereof.

As used herein, the term "connector" refers to any components of an electronic system configured to establish an interface.

FIGS. 1-10 are attached hereto and incorporated herein by reference. The following detailed description refers to the accompanying FIGS. 1-10. The same reference numbers in different figures may identify the same or similar elements.

The device, systems, methods, technologies and/or techniques described herein may provide a multi-functional cord that can be used in connection with one or more user devices specified by a user associated with the cord. The user may program the multi-functional cord to enable the multi-functional cord to operate in a particular manner when associated with a first user device and may preclude the multi-functional cord from operating when associated with a second user device. The multi-functional cord may also, or alternatively, be pre-programmed to work with a particular user device, such as, in a non-limiting example, when the multi-functional cord is sold with the user device.

The multi-functional cord may include a cord that is capable of enabling or precluding electrical power, and/or electrical and/or optical data signals from traveling via the multi-functional cord (sometimes referred to as "data transfer"). The cord may include and/or be connected to (permanently or temporarily) at least one connector at each end of the cord. The multi-functional cord may include a control block, to be described in greater detail below, to manage and/or control the manner in which the multi-functional cord can operate, with which user device to operate or not operate, and/or with which user to operate or not operate. Additionally, or alternatively, the multi-functional cord may work with a gaming device, headphones, an audio device, a computer peripheral device (e.g., a printer, hard drive, etc.), or some other communication and/or computing device. The term "connect" or "connected" may be a wireless connection, a wired connection, or a combination of wired and wireless connections.

The control block may be programmed by a user, of a first user device, with administrative rights (e.g., such as a user that purchased and/or set up the multi-functional cord). Alternatively, the user may use the first user device, that stores and/or executes an application (a multi-functional cord application), to program the control block based on information and/or parameters specified by the user. The first user device may communicate with the control block via a network (e.g., based on an Internet version 6 (IPv6) protocol, a Hypertext Transfer Protocol (HTTP), a secure HTTP protocol (HTTPS), a tunneling protocol, and the like) and/or via wired or wireless link (e.g., a BLUETOOTH protocol, a near-field protocol, beaming, etc.). The multi-functional cord may, for example, enable electrical power (e.g., direct current (DC) and/or alternating current (AC)), and/or data transfer to and/or from a first user device that has been authorized by the user. The multi-functional cord may also, or alternatively, perform a security operation by permitting data and/or traffic to flow to and/or from one or more other devices (e.g., other user devices, server devices, etc.) and/or network addresses (e.g., a web address, an Internet Protocol (IP) address, a media access control (MAC) address, a uniform resource locator (URL), etc.) that are authorized by the user of the first user device. The multi-functional cord may also, or alternatively, perform a security operation that blacklists one or more other user devices and/or network addresses by precluding communications with a blacklisted user device and/or network address as specified by the user. The security operation may also, or alternatively, include authenticating a user, user device, or some other device with which multi-functional cord is connected. The security operation may also include providing virus protection services, firewall services, etc.

The user may program the control block in a manner that grants different access rights and/or services to different user devices and/or different users. For example, the user may program the multi-functional cord so that the first device may use all functionality of the multi-functional cord; a second user device may have access to less functionality; and/or a third user device may not have access to any functionality of the multi-functional cord.

Additionally, or alternatively, the user may program the multi-functional cord in a manner that grants functionality based on rights granted to other users of other user devices. For example, the user may program the multi-functional cord in a manner that permits a second user, of a second user device, rights to access those functions authorized by the user, while precluding a third user, associated with a third user device, from accessing some or all of the functions accessible by the second user. In this case, the second user may use the multi-functional cord for any device with which the second user is associated, and the third user may be denied use of the multi-functional cord regardless of which user device with which the third user is associated.

FIG. 1 illustrates a diagram of an example multi-functional cord system 100 in which the systems, methods, and/or devices described herein may be implemented. As shown in FIG. 1, multi-functional cord system 100 may include a multi-functional cord 110 (hereinafter, "cord 110"), user device 120 and network 130. The devices, components and networks, illustrated in FIG. 1 are provided for explanatory purposes only, and multi-functional cord system 100 is not intended to be limited to the devices, components, or networks provided therein. There may be additional devices, components or networks; fewer devices, components or networks; different devices, components or networks; or differently arranged devices, components or networks than illustrated in FIG. 1. Also, in some implementations, one or more of the devices, components or networks of FIG. 1 may perform one or more functions described as being performed by another one or more of the devices, components or networks of FIG. 1.

Multi-functional cord 110 may include a cord 112, connectors 114-1 and 114-2 (hereinafter, each a "connector 114" and together "connectors 114") and a control block 116. Cord 112 may include one or more first conductive wires (e.g., formed by copper, aluminum, gold, silver, and/or some other conductive material) to carry and/or transport one or more electrical power and/or data signals (e.g., power cord, a Universal Serial Bus (USB), an Ethernet cable, a coaxial cable, etc.) based on electrical power and/or signals flowing via the conductive wires. Cord 112 may also, or alternatively, include one or more optical fibers to carry data and traffic based on light signals traveling via the one or more optical fibers. Connector 114 may enable multi-functional cord 110 to connect to a user device 120 and/or some other user device 120. In a non-limiting example, connector 114 may correspond to a Universal Serial Bus (USB), a micro-USB, an iOS (Lightning), an Ethernet cable jack or connector, a coaxial cable connector, a single or multi-mode fiber optic connector, or some other connector or interface, to connect multi-functional cord 110 to a first user device 120 (e.g., via connector 114-1) and/or a second user device 120 (e.g., via connector 114-2) to enable traffic to flow between first user device 120 and second user device 120 via network 130. Additionally, or alternatively, connector 114 may correspond to a DC plug or interface, to connect to a DC power source (e.g., a battery charger, a battery pack, etc.) and/or a conventional AC plug and/or USB, mini-USB, or iOS connector that connects to an AC adaptor that connects to an AC power source to enable user device 120 to be charged.

Control block 116, to be described in greater detail in FIG. 2 below, may be programmed by a user to identify with which user device 120 multi-functional cord 110 is authorized to communicate, provide power, and/or to provide a service. Control block 116 may include a user interface 118 that includes one or more buttons, displays, touch screens, etc. with which a user may interact to program and/or control multi-functional cord 110. Control block 116 may also, or alternatively, be programmed to identify which other user, associated with another user device 120, is authorized to use multi-functional cord 110. The user may program control block 116 by interacting with user interface 118 (e.g., by pressing one or more buttons, interacting with a touch screen, etc.) and/or by interacting with an application executing on user device 120 that can communicate with control block 116 via network 130, directly using near-field communication (e.g., blue tooth, beaming, and/or some other near-field protocol), and/or via a wired connection (e.g., such as connector 114). Control block 116 may, for example, authenticate a first user device 120 when the user has specified that multi-functional cord 110 is authorized to interact and/or communicate with first user device 120 and/or to charge first user device 120. Control block 116 may not authenticate a second user device 120 when the user has specified that multi-functional cord 110 is not authorized to interact and/or communicate with second user device 120 and/or to charge second user device 120.

Control block 116 may determine which function and/or service is to be performed based on input received from an authorized user and/or user device 120. For example, control block 116 may determine whether multi-functional cord 110 is to enable a charging service to be provided to user device 120. In another non-limiting example, control block 116 may determine whether multi-functional cord 110 is to enable a communication service to be provided to user device 120. In yet another non-limiting example, control block 116 may determine whether multi-functional cord 110 is to provide a security service to user device 120. The security service may include a user authentication service, a user device 120 authentication service, a firewall service (e.g., by blocking unauthorized user devices 120 and/or network addresses), a virus detection service, etc.

Control block 116 may authenticate a first user device 120 connected to a first connector 114 (e.g., 114-1) at one end of multi-function cord 110 and/or may authenticate a second user device 120 connected to second connector 114 (e.g., connector 114-2) at an opposite end of multi-function cord 110. Authentication of the first and second user devices 120 may enable a communication session to be established between first and second user devices 120 if control block 116 stores information indicating that both first and second user devices 120 are authorized to send and/or receive data. Authentication of the first and second user devices 120 may enable second user device 120 to charge first user device 120 if control block 116 stores information indicating that second user device 120 is authorized to provide electrical power via multi-functional cord 110 and first user device 120 is authorized to receive electrical power via multi-functional cord 110.

User device 120 may include any computation or communication device, such as a wireless mobile communication device, that is capable of communicating with network 130, directly or indirectly. For example, user device 120 may include a personal communications system (PCS) terminal (e.g., such as a smart phone that may include data processing and data communications capabilities), a personal digital assistant (PDA) (e.g., that can include a pager, Internet/intranet access, etc.), a laptop computer, a tablet computer, a personal computer, a camera, a personal gaming system, or another type of computation or communication device. Additionally, or alternatively, user device 120 may include logic, such as one or more processing or storage devices, that can be used to perform processing activities on behalf of a user.

In one example implementation, user device 120 may include a global positioning satellite (GPS) component that communicates with a GPS constellation to provide and/or obtain location information associated with user device 120. Additionally, or alternatively, user device 120 may include logic, such as one or more processing or storage devices, that can be used to perform and/or support processing activities on behalf of a user.

User device 120 may perform communication operations by sending data to and/or receiving data from another device, such as another user device 120, multi-functional cord 110 and/or a server device. Data may refer to any type of machine-readable information having substantially any format that may be adapted for use in one or more networks and/or with one or more components. Data may include digital information or analog information. Data may further be packetized and/or non-packetized. User device 120 may include logic for performing computations on user device 120 and may include the components illustrated in FIG. 4 in an example implementation. Such components may execute one or more instructions to perform functions as described herein.

User device 120 may include an input device for the input of information, as further described herein, and/or a display device to display information, as further described herein. Additionally, or alternatively, the user device may include an input and/or output mechanism that may allow for the transfer of data, including sensitive data, from/to the user device from/to a server and/or another user device. In one non-limiting implementation, the user device may not be in persistent communication and/or connection with network but may, when accessed and/or communicated with, communicate with a server and/or another user device.

User device 120 may store, install and/or execute an application (e.g., a mobile application, logic, software application installed on a user device, etc.) that enables the user to communicate with, set up and/or manage multi-functional cord 110. For example, the user may open the application on user device 120 and may associate multi-functional cord 110 with user device 120 and/or the user by causing information associated with user device 120 (e.g., a mobile directory number (MDN), an electronic serial number, etc.) and/or the user (e.g., a name, address, personal identification number (PIN), a password, a subscriber identity module (SIM), uniform resource identifier (URI), biometric information associated with the user (e.g., a copy of a fingerprint, a retina scan, etc.) to be transmitted to and/or stored in a memory associated with multi-functional cord 110. The user may identify one or more other user devices 120 and/or users to be authorized use of multi-functional cord 110. The user may also, or alternatively, identify one or more services that the other authorized user devices 120 and/or users may access. In a non-limiting example, a second user device 120 may be authorized to use multi-functional cord 110 to charge second user device 120. In yet another non-limiting example, a fourth user device 120 may be authorized to use multi-functional cord 110 to send or receive data and receive a security service (e.g., authentication, blacklist, firewall, virus protection, and/or other security service). In still another non-limiting example, a fifth user device 120 may be authorized to use multi-functional cord 110 only when a second authorized user is using the fifth user device 120.

Network 130 may include one or more wired and/or wireless networks. For example, network 130 may include a wide area network (WAN), a metropolitan network (MAN), a telephone network (e.g. the Public Switched Telephone (PSTN)), an ad hoc network, an intranet, the Internet, a fiber optic based network, and/or a combination of these or other types of networks. Additionally, or alternatively, network 130 may include a cellular network, a public land mobile network (PLMN), a second generation (2G) network, a third generation (3G) network, a fourth generation (4G) network (e.g., a long-term evolution (LTE) network), a fifth generation (5G) network, and/or another network.

Referring still to FIG. 1, additional details and/or alternatives regarding multi-functional cord system 100 are described below, which may include features of one or more implementations and embodiments of multi-functional cord system 100 as well as the associated methods and apparatuses as implemented therein.

The hardware and architecture of multi-functional cord system 100 may include, but is not limited to, the following components:

A cord 112 (for example, cord 112 as described above) via which electrical power signals, and/or electrical and/or optical communication signals can be transmitted. Such cord may include one or more electrical conductors and/or optical fibers via which the signals may travel such as a power cord, USB data cord, Ethernet cord, coaxial cable, optical fiber, fiber cable, etc.

A control block (for example, control block 116 as described above) that is connected to or made part of a first end of the cord and which includes a first connector (e.g., without limitation a first universal serial bus (USB), micro-USB, iOS (Lightning) connector, Ethernet jack, coaxial cable connector, etc.) that can plug into any device possessing a compatible connector (for example, connector 114-1 as described above). The control block may be plugged into, communicate with, or charge any device that can be authenticated by the control block. The control block may include: a processor; a memory; a communication interface (e.g., one or more buttons); a display (e.g., LED, LCD, command line, etc.); a transmit/receive module, etc.; and a second connector (e.g., a second USB, micro USB, Lightning, optical fiber connector, Ethernet jack, coaxial cable connector, connector, AC plug, DC plug, etc.); and, a battery pack of one or more batteries and a charge device to control battery pack charging or to control the discharge of the battery pack to charge a device with which the control block is connected.

A second connector (for example, connector 114-2 as described above) that is connected to or made part of a second end of the cord that is opposite the first end with which the control block is associated. The second connector may correspond to a conventional alternating current (AC) plug, a direct current (DC) plug, USB, micro-USB, iOS (Lightning) connector, optical fiber connector, Ethernet jack, coaxial cable connector, etc.) that can plug into (i) a power source (e.g., DC, AC, an optical, etc. source) or an adaptor that accepts the second connector (e.g., a block that plugs into a DC, AC, optical, etc. source). Connecting the Multifunctional Cord to the power source may charge the battery pack and/or may cause the Multifunctional Cord to permit the battery pack to charge a device with which the control block is connected; (ii) a data source, such as a second device that can charge and/or communicate with the first device with which the control block is associated. Such components may be connected by wired, wireless, or a combination of wired and wireless connections.

A mobile application 122 that is downloadable to the first device may be used to program the control box to associate the cord with the first device. Mobile application 122 may also, or alternatively, correspond to software that is installed on and executes on the first device (e.g., a laptop, desktop, etc.), or logic that is based on software, hardware, or a combination of software and hardware. Mobile application 122 may also be used to associate the cord with any other device that the user of the first device desires. Mobile application 122 may enable the first device to communicate with the cord via blue tooth or when the cord is plugged into the first device. Mobile application 122 may also control rights associated with multiple devices. For example, mobile application 122 may be used to program the cord to permit data transfer, charging and security functionality when connected to the first device; only charging functionality when connected with a second device, only data transfer and security functionality when connected to a third device, etc.

Mobile application 122 may enable the first device to be able to track the location of the cord (using cord GPS signals) in the event it is misplaced. When the cord is misplaced, the application may enable the first device to be able to communicate with another device to determine whether the cord is connected to the other device.

Various routines and methods implemented by multifunctional cord system 100 may include one or more of the following:

Authentication and Communication with Electronic Device

Multifunctional Cord 110 may be preprogrammed (e.g., during manufacture, during packaging with a first device, etc.) to store (in the memory) information associated with a first device with which the cord is associated. Alternatively, Multifunctional Cord 110 may be purchased separately and programmed using the application to associate Multifunctional Cord 110 with the first device. The first device information may include information that uniquely identifies the first device (e.g., an electronic serial number (ESN), a mobile equipment identifier (MEID), a mobile directory number (MDN), an international mobile subscriber identity (IMSI), a subscriber identity module uniform resource identifier (SIM URI), etc., that uniquely identifies the first device).

Authentication of the First Device

A user may connect Multifunctional Cord 110 into the first device. The control block 116 may send a request to the first device to obtain first device information that uniquely identifies the first device. The first device may receive the request and may transmit the first device information to the control block. Multifunctional Cord 110 may receive the first device information and may compare the received first device information with stored first device information (e.g., stored in the memory). Multifunctional Cord 110 may authenticate the first device when the received first device information matches the stored first device information. Based on the authentication, Multifunctional Cord 110 may enable the first device to: (i) communicate via Multifunctional Cord 110 (e.g., by sending or receiving data); (ii) receive power from the Multifunctional Cord 110 (when Multifunctional Cord 110 is in Charge Mode); or (iii) receive power via Multifunctional Cord 110 from a power source.

Authentication of Multiple Devices

Authentication may also, or alternatively, include authenticating the first device with which Multifunctional Cord 110 is connected and a second device with which Multifunctional Cord 110 is connected. Communication and/or power transfer between the first and second devices may be permitted when the Multifunctional Cord 110 is able to authenticate both the first and second devices.

Authentication of a User

Authentication need not be limited to device authentication. For example, authentication may also, or alternatively, include authentication of the user of the first device. For example, the user may be required to enter a password, a personal identification number (PIN), a username, biometric information, an answer to a security question, etc. Multifunctional Cord 110 may receive the entered information associated with the user and may compare it with user information stored in the memory. If the received user information matches the stored user information, Multifunctional Cord 110 may authenticate the user and may enable the first device to (i) communicate via Multifunctional Cord 110 (e.g., by sending or receiving data); (ii) receive power from Multifunctional Cord 110 (when Multifunctional Cord 110 is in Charge Mode); or receive power via the Multifunctional Cord from a power source.

Authentication Based on Time or Geographic Location

Authentication schemes may be based on location (at or near such location, communications are authorized or not authorized), a time (e.g., authentication may be granted based on a time lease, a time of the day, week, month, year, etc.), etc.

Non-Authentication and Denial of Communication or Power Transfer

A user may plug the Multifunctional Cord 110 into a second device. If Multifunctional Cord 110 does not store second device information, Multifunctional Cord 110 will prevent power or communication signals from traveling to or from the second device via Multifunctional Cord 110. This feature may deter a user of the second device from borrowing or stealing Multifunctional Cord 110 to use with the second device.

Failure to Authenticate the Second Device

A user may connect Multifunctional Cord 110 with the second device. Multifunctional Cord 110 may send a request to the second device to obtain second device information that uniquely identifies the second device. The second device may receive the request and may transmit the second device information to Multifunctional Cord 110. Multifunctional Cord 110 may receive the second device information and may compare the received second device information with stored second device information (e.g., if any is stored in the memory). Multifunctional Cord 110 may not authenticate the second device if the received second device information does not match the stored second device information. Based on the failure to authenticate the second device, Multifunctional Cord 110 may preclude the second device from communicating via Multifunctional Cord 110.

Programming the Multifunctional Cord to Communicate with Other Authorized Devices Assume that Multifunctional Cord 110 is connected to the first device. The first device may store an application (e.g., an application, a downloadable application, a SaaS application, etc.) that enables the first device to communicate with Multifunctional Cord 110 of the Multifunctional Cord. The user may open the application to identify which devices Multifunctional Cord 110 is authorized to communicate with. In a non-limiting example, Multifunctional Cord 110 may store first device information (that uniquely identifies the first device) and third device information that uniquely identifies a third device (e.g., a third lap top computer, a third smartphone, a third tablet computer, etc.). If the user no longer wishes to authorize Multifunctional Cord 110 to communicate with the third device, the user may use the application to deny authorization (e.g., by associating a flag with the third device information, deleting the third device information, etc.). Additionally, if the user desires to authorize Multifunctional Cord 110 to communicate with a fourth device the user may cause the first device or Multifunctional Cord 110 to communicate with the fourth device to obtain fourth device information and may store the fourth device information in the memory associated with Multifunctional Cord 110.

Firewall

Multifunctional Cord 110 may store and execute instructions that enable packets and/or traffic received from black listed devices and/or IP addresses from being transmitted to the first device (or any device with which Multifunctional Cord 110 has authenticated).

Denial of Electronic Attack

Multifunctional Cord 110 may store and execute instructions to identify when malicious software has been detected and/or when an electronic attack has been initiated and/or is underway and may prevent any communication to the first device.

Figure 2:
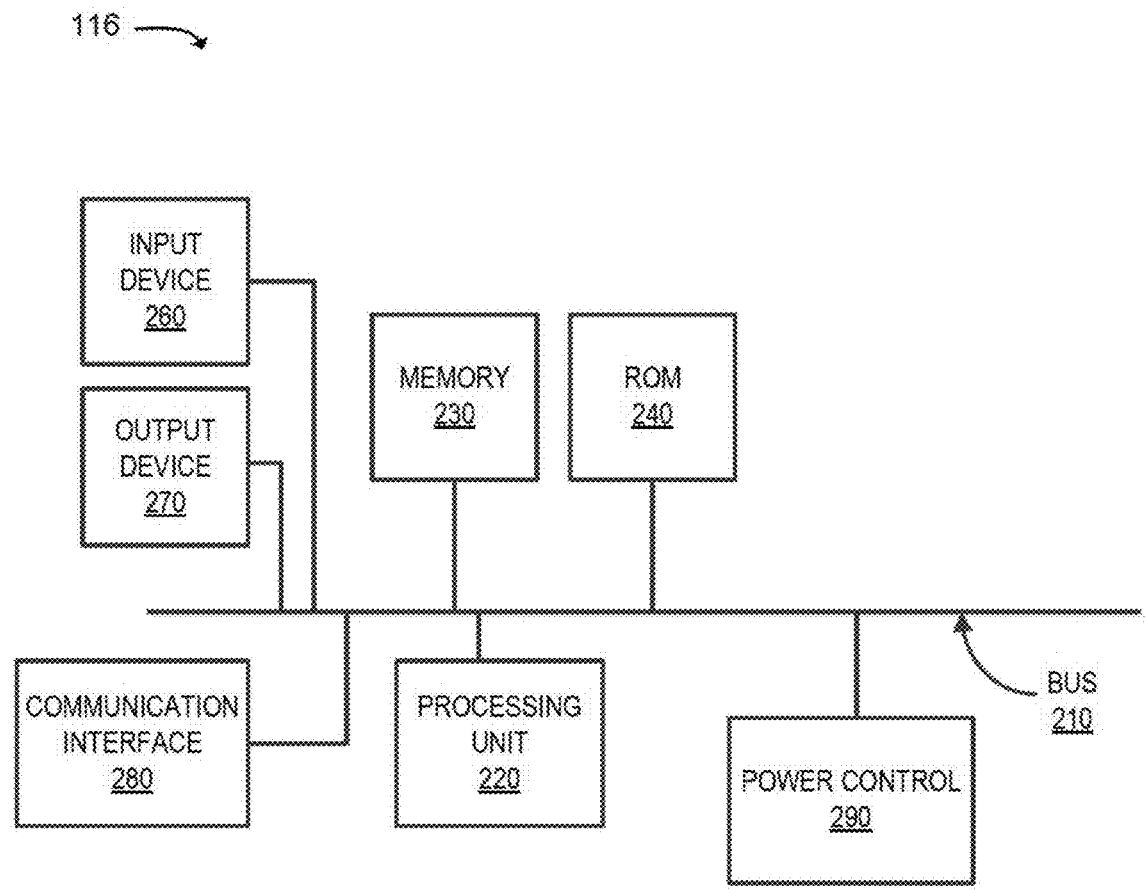
FIG. 2 illustrates a diagram of example components that may correspond to the control block of FIG. 1.

Referring now to FIG. 2, block 116 may include a collection of components, such as a bus 210, a processing unit 220, a memory 230, a read-only memory ("ROM") 240, an input device 260, an output device 270, a communication interface 280 and/or a power control 290. Bus 210 may include a path that permits communication among the components of block 116.

Although FIG. 2 depicts example components of block 116, in other implementations, block 116 may include fewer components, additional components, different components, or differently arranged components than illustrated in FIG. 2. For example, block 116 may include a user device. In still other implementations, one or more components of block 116 may perform one or more tasks described as being performed by one or more other components of block 116.

Processing unit 220 may include a processor, multiple processors, microprocessors, or other types of processing logic that may interpret, execute, and/or otherwise process information and/or data contained in, for example, memory 230. The information may include computer-executable instructions and/or data that may implement one or more embodiments of the Systems and/or Methods. Processing unit 220 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Processing unit 220 may comprise a single core or multiple cores. Moreover, processing unit 220 may comprise a system-on-chip (SoC) or system-in-package (SiP). Additionally, or alternatively, processing unit 220 (and/or another component of block 116) may be configured to generate and/or update keys (e.g., encryption keys, rotating keys, etc.).

Memory 230 may include a random-access memory (RAM) or another type of dynamic storage device that may store information and instructions for execution by processing unit 220. Memory 230 may store information that identifies one or more user devices 120 with which multifunctional cord 110 is authorized to communicate, receive power, and/or receive security services. Memory 230 may also, or alternatively, store information that identifies which services (e.g., communications, electrical power, security, etc.) each user device 120. Memory 230 may store information that identifies one or more users that are authorized to use multi-functional cord 110. ROM 240 may include a ROM device or another type of static storage device that may store static information and/or instructions for use by processing unit 220.

Input device 260 may include a mechanism that permits an operator to input information to block 116, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a speaker, etc. In the case of a display, the display may be a touch screen display that acts as both an input and an output device. Input device 260 and/or output device 270 may be haptic type devices, such as joysticks or other devices based on touch.

Communication interface 280 may include any transceiver-like mechanism that enables block 116 to communicate with other devices and/or systems. For example, communication interface 280 may include mechanisms for communicating with another device or system via a network, e.g., a network interface card.

Block 116 may perform certain operations in response to processing unit 220 executing software instructions contained in a computer-readable medium, such as main memory 230. For instance, block 116 may implement an application by executing software instructions from main memory 230. A computer-readable medium may be defined as a non-transitory memory device, where the memory device may include a number of physically, possibly distributed, memory devices. The software instructions may be read into main memory 230 from another device via communication interface 280. The software instructions contained in main memory 230 may cause processing unit 220 to perform processes that will be described later. Alternatively, hardwired circuitry may be used in place of, or in combination with, software instructions to implement processes described herein. Thus, implementations described herein are not limited to any specific combination of hardware circuitry and software.

Power control 290 may implement instructions from processing unit 220 to control whether block 116 will enable power to flow to and/or from user device 120 with which multi-functional cord 110 is associated. Power control 290 may include a switch that, when closed, allows electrical power to flow and when open precludes electrical power from flowing.

Figure 3:
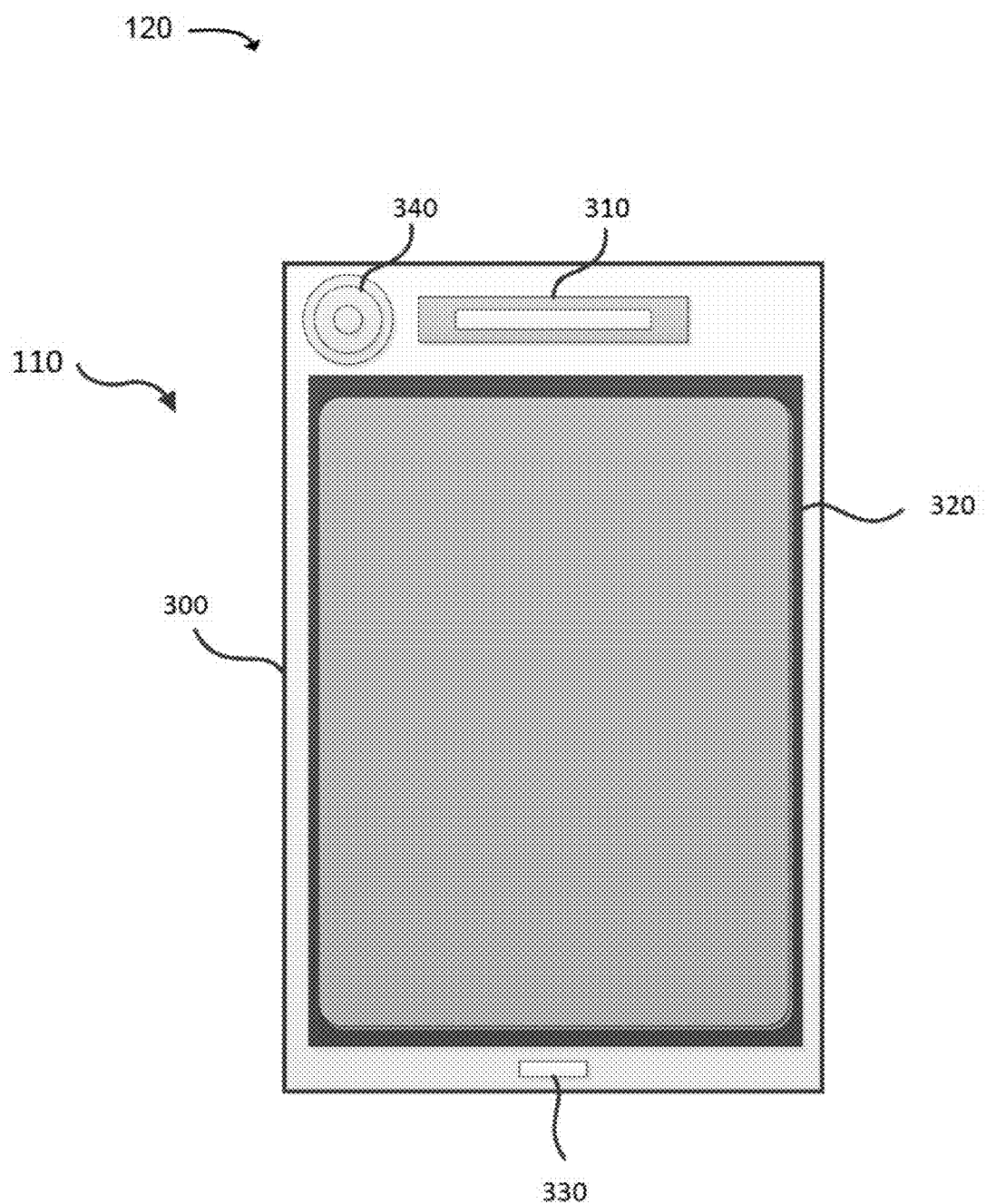
FIG. 3 illustrates a schematic view of an example user device of FIG. 1.

FIG. 3 is a diagram of an example user device 120. As shown in FIG. 3, user device 120 may include a housing 300, a speaker 310, a display 320, and a microphone 330. Housing 300 may include a chassis via which some or all of the components of user device 120 are mechanically secured and/or covered. Speaker 310 may include a component to receive input electrical signals from user device 120 and to transmit audio output signals, which communicates audible information to a user of user device 120.

Although FIG. 3 depicts example components of user device 120, in other implementations, user device 120 may include fewer components, additional components, different components, or differently arranged components than illustrated in FIG. 3. For example, user device 120 may include a keyboard, a keypad, and/or other input components. In other implementations, one or more components of user device 120 may perform one or more tasks described as being performed by one or more other components of user device 120. In still other implementations, user device 120 may include and/or be configured to be in wired and/or wireless communication with cord 110, network 130 and/or another user device 120, such that user device 120 may send and/or receive data to and/or from cord 110 and/or another user device 120 via network 130.

Display 320 may include a component to receive input electrical signals and present a visual output in the form of text, images, videos and/or combinations of text, images, and/or videos which communicate visual information to the user of user device 120. In one implementation, display 320 may display text input into user device 120, text, images, and/or video received from another user device 120, and/or information regarding incoming or outgoing calls or text messages, emails, media, games, phone books, address books, the current time, and the like.

Display 320 may be a touch screen that presents one or more images that corresponds to control buttons. The one or more images may accept, as input, mechanical pressure from the user (e.g., when the user presses or touches an image corresponding to a control button or combinations of control buttons) and display 320 may send electrical signals to a processor associated with user device 120 that may cause user device 120 to perform one or more operations. For example, the control buttons may be used to cause user device 120 to transmit information. Display 320 may present one or more other images associated with a keypad that, in one example, corresponds to a standard telephone keypad or another arrangement of keys. Microphone 330 may include a component to receive audible information from the user and send, as output, an electrical signal that may be stored by user device 120, transmitted to another user device 120 or cause the user device 120 to perform one or more operations.

Microphone 330 may include a component to receive audible information from the user and send, as output, an electrical signal that may be stored by user device 120, transmitted to another user device, or cause the device to perform one or more operations. Camera 340 may be provided on a front or back side of user device 120, and may include a component to receive, as input, analog optical signals and send, as output, a digital image or video that can be, for example, viewed on display 320, stored in the memory of user device 120, discarded and/or transmitted to another user device 120.

Figure 4:
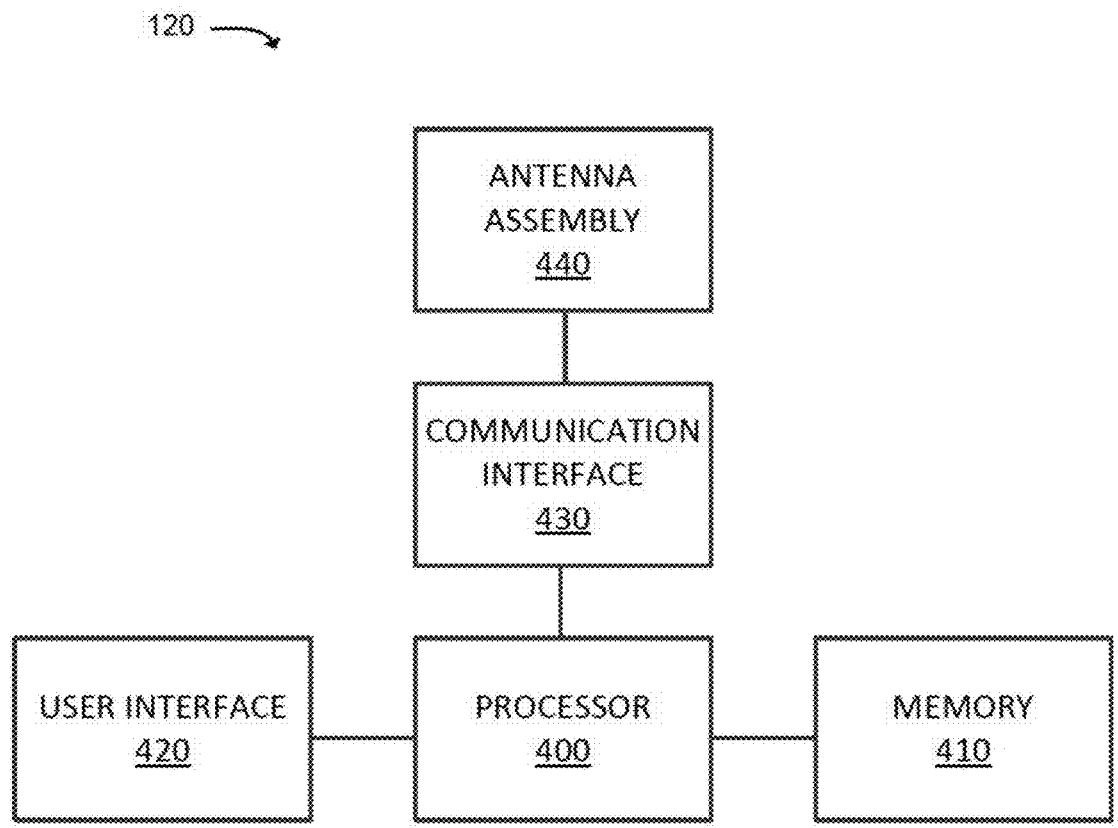
FIG. 4 illustrates a diagram of example components of the user device of FIG. 3.

FIG. 4 is a diagram of example components of user device 120. As shown in FIG. 4, user device 120 may include a processor 400, a memory 410, a user interface 420, a communication interface 430, and/or an antenna assembly 440. Although FIG. 4 shows example components of user device 120, in other implementations, user device 120 may include fewer components, additional components, different components, or differently arranged components than depicted in FIG. 4. In still other implementations, one or more components of user device 120 may perform one or more tasks described as being performed by one or more other components of user device 120.

Processor 400 may include a processor, a microprocessor, an ASIC, a FPGA, or the like. Processor 400 may control operation of user device 120 and its components. In one implementation, processor 400 may control operation of components of user device 120 in a manner similar to that described herein. Memory 410 may include a RAM, a ROM, and/or another type of memory to store data and/or instructions that may be used by processor 400.

User interface 420 may include mechanisms for inputting information to user device 120 and/or for outputting information from user device 120. Examples of input and output mechanisms might include buttons (e.g., control buttons, keys of keypad, a keyboard, a joystick, etc.); a touch screen interface to permit data and control commands to be input into user device 120 via display 320; a speaker (e.g., speaker 310) to receive electrical signals and output audio signals; a microphone (e.g., microphone 330) to receive audio signals and output electrical signals; a display (e.g., display 320) to output visual information (e.g., user interfaces, web pages, etc.); a vibrator to cause user device 120 to vibrate; and/or camera 340 to receive video and/or images.

Communication interface 430 may include a transceiver to perform functions of both a transmitter and a receiver of wireless communications, wired communications, or a combination of wireless and wired communications, including communications to/from user device 120 and another user device 120.

User device 120 may perform certain operations described herein in response to processor 400 executing software instructions of an application contained in a computer-readable medium, such as memory 410. The software instructions may be read into memory 410 from another computer-readable medium or from another device via communication interface 430. The software instructions contained in memory 410 may cause processor 400 to perform processes that will be described later. Alternatively, hardwired circuitry may be used in place of or in combination with software instructions to implement processes described herein. Thus, implementations described herein are not limited to any specific combination of hardware circuitry and software.

Memory 410 may store information and instructions for execution by processor 400. Sensitive data may be read into memory 410 from another computer-readable medium, from another device and/or user device 120 via communication interface 430, and/or from user interface 420. For example, memory 410 may store an application (e.g., a mobile application, logic, software application installed on a user device, a combination of software and hardware, etc.) that, when executed, can be used to communicate with control block 116 and/or to program control block 116.

Figure 5:
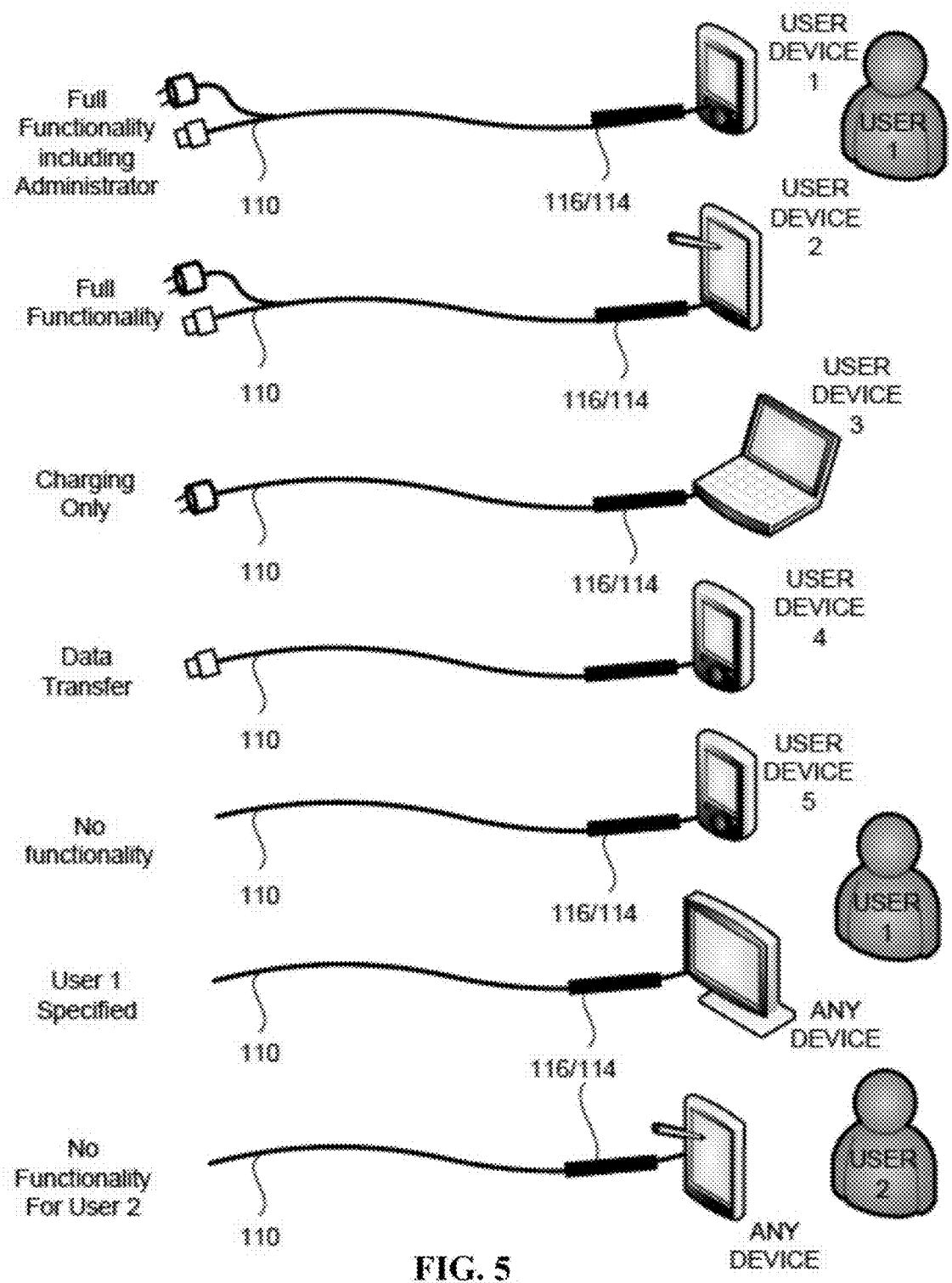
FIG. 5 is a functional diagram of various exemplary modes of operation for a multifunctional cord, in accordance with certain aspects of the present disclosure.

FIG. 5 illustrates example embodiments of the multifunctional cord 110 in which the systems, methods, and/or devices described herein may be implemented. As shown in FIG. 5, multi-functional cord 110 may be programmed in a manner that authorizes communication with a first user device 120 (shown as user device 1 in FIG. 5). Communication with first user device 120 may be authorized when a first user, associated with first user device 120, can be authenticated. For example, the first user may plug multi-functional cord 110 into first user device 120 to obtain information associated with first user device 120 (e.g., an MDN, an ESN, etc.). Control block 116 may authenticate first user device 120 when the information associated with first user device 120 matches information, associated with first user device 120, stored in a memory associated with block 116. Control block 116 may not authenticate first user device 120 when the information, associated with first user device 120, does not match the stored information. In the event that first user device 120 is authenticated, control block 116 may authenticate the first user by obtaining information, associated with the first user, from first user device 120 (e.g., a SIM URI, a etc.) and/or from information entered by the first user (e.g., username, password, PIN, biometric information, etc.) via a user interface provided by the application being executed on first user device 120. Control block 116 may authenticate the first user if the obtained information, associated with the user, matches stored information associated with the first user and may not authenticate the first user when the obtained information does not match the stored information. If control block 116 can authenticate first user device 120 and the first user, then control block 116 may authorize one or more services to be made available to first user device 120. Control block 114 may obtain, from a memory, information that identifies which services are authorized for first user device 120. In this non-limiting example, the information that indicates that user device 120 is authorized to receive full functionality (e.g., charging, data communications, security services, etc.) as well as administrative rights (e.g., to enable first user to program multi-functional cord 110).

In another non-limiting example, multi-functional cord 110 may be programmed (e.g., by first user using first user device 120) to authorize one or more services to be made available to a second user device 120 (e.g., shown as user device 2 in FIG. 5). In this example, second user device 120 may be authorized to receive full functionality (e.g., charging, data communications, security services, etc.) from multi-functional cord 110 without authenticating the first user. Such authorization may not include administrative rights.

In yet another non-limiting example, multi-functional cord 110 may be programmed (e.g., by first user using first user device 120) to authorize charging of a third user device 120 (e.g., shown as user device 3 in FIG. 5) when multi-functional cord 110 is connected to an electrical power supply. In this example, third user device 120 may not be authorized to send and/or receive data, security services, etc.

In still another non-limiting example, multi-functional cord 110 may be programmed (e.g., by first user using first user device 120) to authorize data communications of a fourth user device 120 (e.g., shown as user device 4 in FIG. 5) when multi-functional cord 110 is connected to another user device 120 and/or network 130. Additionally, or alternatively, multi-functional cord 110 may be programmed to provide a security service to the fourth user device 120. In this example, fourth user device 120 may not be authorized to receive electrical power to charge fourth user device 120.

In another non-limiting example, multi-functional cord 110 may be programmed (e.g., by first user using first user device 120) in a manner that does not authorize a fifth user device 120 (e.g., shown as user device 5 in FIG. 5) to receive any services from multi-functional cord 110.

In another non-limiting example, multi-functional cord 110 may be programmed to communicate with any user device 120 (e.g., shown as any device in FIG. 5) that the first user authorizes without authenticating any user device 120. In this example, the type of service (e.g., charging, data communication, security, etc.) that any authorized user device 120 may receive may be authorized by the first user.

In yet another non-limiting example, multi-functional cord 110 may be programmed to not communicate with any user device 120 (e.g., shown as any device in FIG. 5) with which a second user (e.g., shown as user 2 in FIG. 5) is associated. In this example, any user device 120 with which the second user is associated may not receive any services from multi-functional cord 110.

Figure 6:
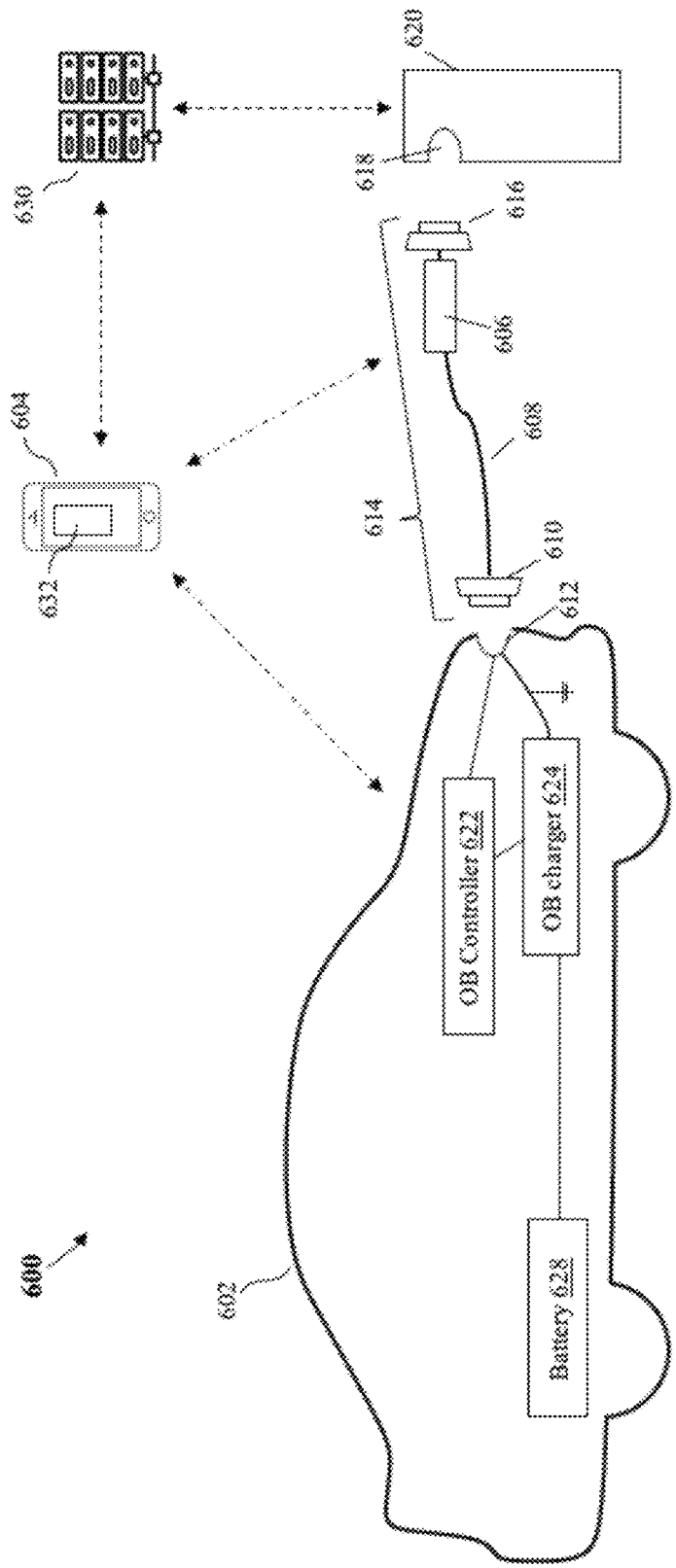
FIG. 6 is an architecture diagram of an electric vehicle charging system, according to an embodiment.

Referring now to FIG. 6, an architecture diagram of an electric vehicle charging system 600 is shown. According to an embodiment, electric vehicle charging system 600 comprises an electric vehicle transfer interface 614 to enable selective transmission of power and/or data between an electric vehicle 602 and an electric vehicle charging facility or power source 620. Electric vehicle 602 may comprise a vehicle, such as a passenger automobile, comprising an electric motor and drive train being operably engaged with a battery 628, an onboard charger 624, and an onboard controller 622. In certain embodiments, onboard charger 624 is operably engaged with an electric vehicle inlet 612 to receive electricity from electric vehicle inlet 612 and store it in battery 628. Onboard controller 622 may be operably engaged with onboard charger 624 and electric vehicle inlet 612 to regulate the flow of power between electric vehicle inlet 612 and battery 628 and may be further configured to receive one or more data packets via electric vehicle inlet 612.

In certain embodiments, electric vehicle transfer interface 614 comprises an electric vehicle connector 610, a power source connector 616, a wireline transfer interface 608, and a controller 606. Electric vehicle connector 610 may be configured to be operably interfaced with electric vehicle inlet 612 of electric vehicle 602, and power source connector 616 may be configured to be operably interfaced with a power source outlet 618 of charging facility or power source 620. Wireline transfer interface 608 may be operably engaged with electric vehicle connector 610 at a first end and power source connector 616 at a second end and configured to enable the transmission of power signals and data signals between power source connector 616 and electric vehicle connector 610. Controller 606 may be operably engaged with one or more of power source connector 616, electric vehicle connector 610 and/or wireline transfer interface 608 to selectively enable and restrict the transmission of power signals and/or data signals between power source connector 616 and electric vehicle connector 610 according to a plurality of transfer permissions. In accordance with certain embodiments, the plurality of transfer permissions may be configured by a user via a user application 632 executing on a computing device 604 and/or a remote server 630 (optional). Computing device 604 may comprise any commercial off-the-shelf computing device, such as a smart phone, a tablet computer, a laptop computer, a personal computer, and the like. In certain embodiments, computing device 604 may be configured as an onboard computer of electric vehicle 602. In certain embodiments, computing device 604 may be integral to transfer interface 614 and may be configured as a human-machine interface for controller 606. In other embodiments, computing device 604 may be integral to charging facility 620 and may be configured as a human-machine interface for charging facility 620. In certain instances of system 600, computing device 604 and user application 632 may be associated with an administrator user. In such instances, electric vehicle 602 may be configured as an administrator vehicle. In other instances, computing device 604 and user application 632 may be associated with a non-administrator user. In such instances, electric vehicle 602 may be configured as a non-administrator vehicle. User application 632 may be configured to be executed on computing device 604, onboard controller 622, server 630 and/or any combination thereof. User application 632 may be native to computing device 604 or may be executed, in whole or in part, on server 630 and communicated to computing device 604 via a web interface.

Controller 606 may be communicably engaged with one or more of computing device 604, onboard controller 622, charging facility 620 and/or server 630 to authenticate an administrator user and/or a non-administrator user associated with computing device 632. Controller 606 may be further operable to authenticate an administrator vehicle or a non-administrator vehicle either in response to a communication by computing device 604 or in response to a vehicle identifier communicated by onboard controller 622. In accordance with certain aspects of the present disclosure, controller 606 may communicate with one or more of computing device 604, onboard controller 622, charging facility 620 and/or server 630 to configure one or more control settings and/or establish/execute one or more transfer permissions for electric vehicle transfer interface 614. In accordance with the one or more transfer permissions, controller 606 may be configured to disable and/or selectively restrict the transmission of power and/or data between electric vehicle connector 610 and power source connector 616 to the non-administrator vehicle. Controller 606 may be configured enable the transmission of power and/or data between electric vehicle connector 610 and power source connector 616 to the administrator vehicle.

In accordance with certain aspects of the present disclosure, user application 632 may comprise a graphical user interface (or other machine-human interface) to enable an administrative user to configure one or more controls, functions and/or operations of controller 606. In accordance with certain embodiments, the one or more controls, functions and/or operations may include, but are not limited to, configuring electric vehicle 602 as an administrator vehicle; authorizing electric vehicle 602 to receive a full functionality of available services of controller 606 when configured as the administrator vehicle, where the full functionality of available services comprises administrative rights; configuring and authorizing electric vehicle 602 as a non-administrator vehicle to receive a functionality of available services of controller 606 based on one or more transfer permissions defining a selective transmission of power or data between electric vehicle connector 610 and power source connector 616, wherein the functionality of available services authorized for the non-administrator vehicle does not comprise the administrative rights; and authenticating a power and/or data transmission received at power source connector 616 from charging facility 620.

Figure 7:
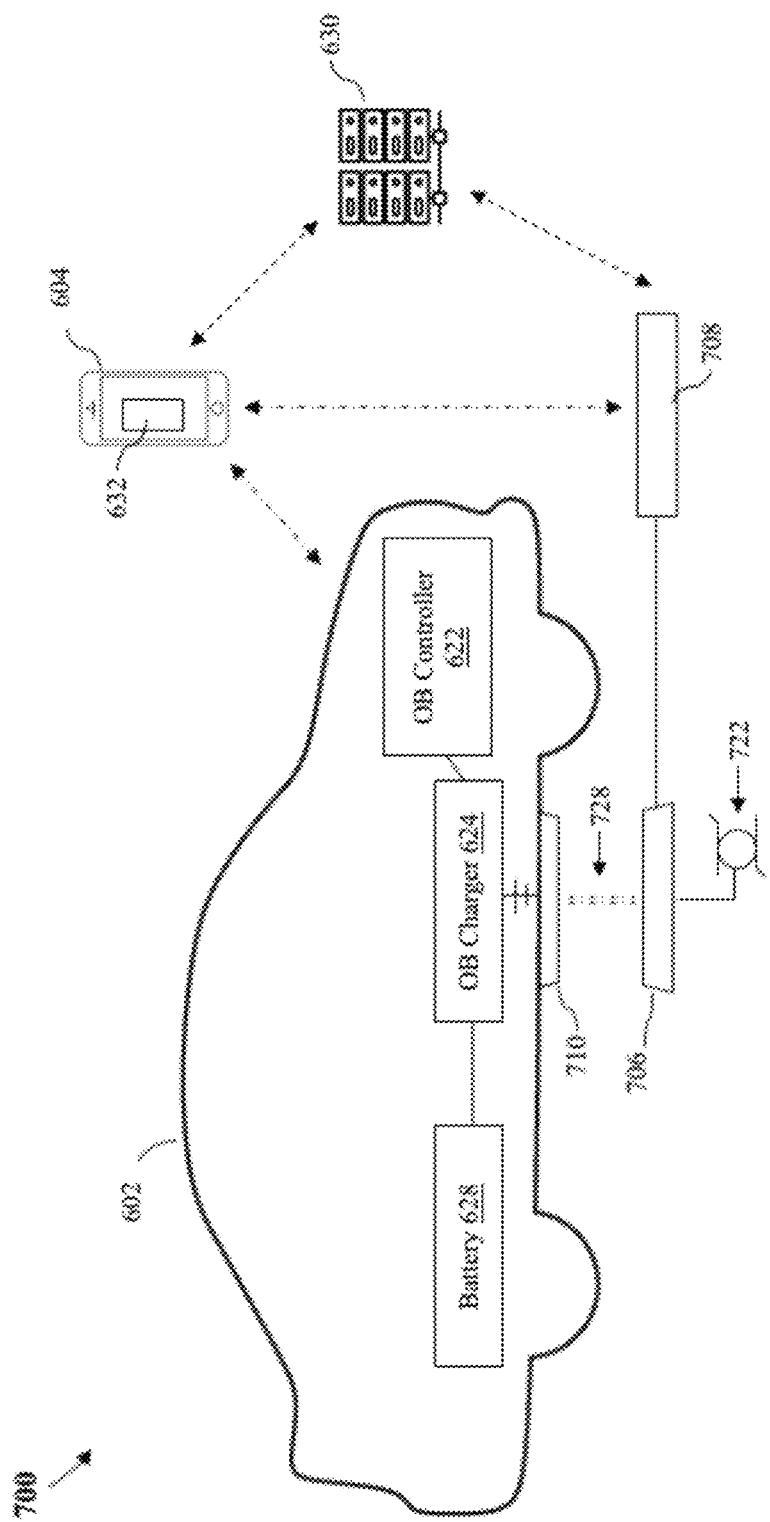
FIG. 7 is an architecture diagram of an electric vehicle charging system, according to an embodiment.

Referring now to FIG. 7, an architecture diagram of an electric vehicle charging system 700 is shown. According to an embodiment, electric vehicle charging system 700 comprises a power capture resonator 710, a power source resonator 706 and a controller 708. Power capture resonator 710 and power source resonator 706 may be operably and communicably engaged via transfer interface 728. Power capture resonator 710 may be configured to receive a magnetic resonance output generated by power source resonator 706 via transfer interface 728. Power source resonator 706 may be configured to generate the magnetic resonance output in response to receiving an A/C or D/C current from power source 722. Power source resonator 706 may further comprise a wireless communications interface configured to wirelessly send one or more data packets to power capture resonator 710 via transfer interface 728. Controller 708 may be operably engaged with power source resonator 706 to selectively control and restrict one or more functions and/or operations of power source resonator 706 according to one or more transfer permissions. Computing device 604 may be communicably engaged with power source resonator 706 to configure the one or more transfer permissions in substantially the same manner as shown and described in FIG. 6, above.

Figure 8:
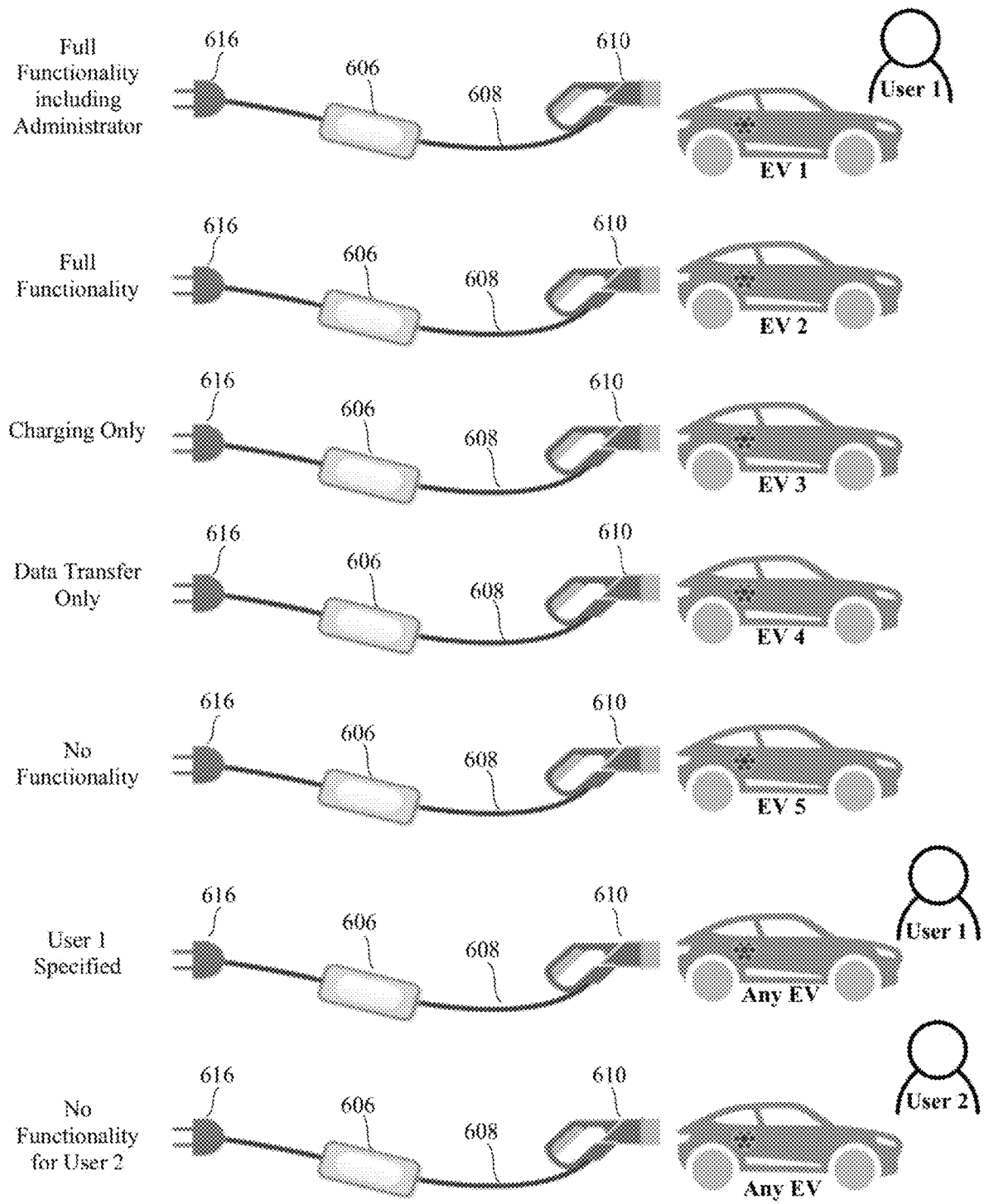
FIG. 8 is a functional diagram of various exemplary modes of operation within an electric vehicle charging system, in accordance with certain aspects of the present disclosure.

Referring now to FIG. 8, with cross-reference made to FIG. 6, a functional diagram of various exemplary modes of operation within electric vehicle charging system 600 (as shown in FIG. 6) is shown. In accordance with certain aspects of the present disclosure, controller 606 may be communicably engaged with computing device 604 (as shown in FIG. 6) to configure one or more functions of power source connector 616, wireline transfer interface 608 and/or electric vehicle connector 610 according to a plurality of transfer permissions. In accordance with certain embodiments, a first set of transfer permissions for an administrative user may include enabling administrative controls for controller 606 and a full functionality of power source connector 616, wireline transfer interface 608 and electric vehicle connector 610 for a first electric vehicle configured as an administrator vehicle. Another set of transfer permissions may include enabling a full functionality of power source connector 616, wireline transfer interface 608 and electric vehicle connector 610 for an electric vehicle configured as a non-administrator vehicle. Another set of transfer permissions may include enabling a charging-only function of power source connector 616, wireline transfer interface 608 and electric vehicle connector 610 for an electric vehicle configured as a non-administrator vehicle. Another set of transfer permissions may include enabling a data transfer-only function of power source connector 616, wireline transfer interface 608 and electric vehicle connector 610 for an electric vehicle configured as a non-administrator vehicle. Still another set of transfer permissions may include disabling all functions of power source connector 616, wireline transfer interface 608 and electric vehicle connector 610 for an electric vehicle configured as a non-administrator vehicle and/or an electric vehicle that has yet to be authenticated, failed authentication, or is otherwise unknown. Still another set of transfer permissions may include enabling administrative controls for controller 606 and a full functionality of power source connector 616, wireline transfer interface 608 and electric vehicle connector 610 for an electric vehicle where the driver of the electric vehicle is authenticated as the administrative user. Yet another set of transfer permissions may include disabling all functions of power source connector 616, wireline transfer interface 608 and electric vehicle connector 610 for an electric vehicle where the driver of the electric vehicle is unknown or is identified as a non-administrative user having restricted transfer permissions.

Figure 9:
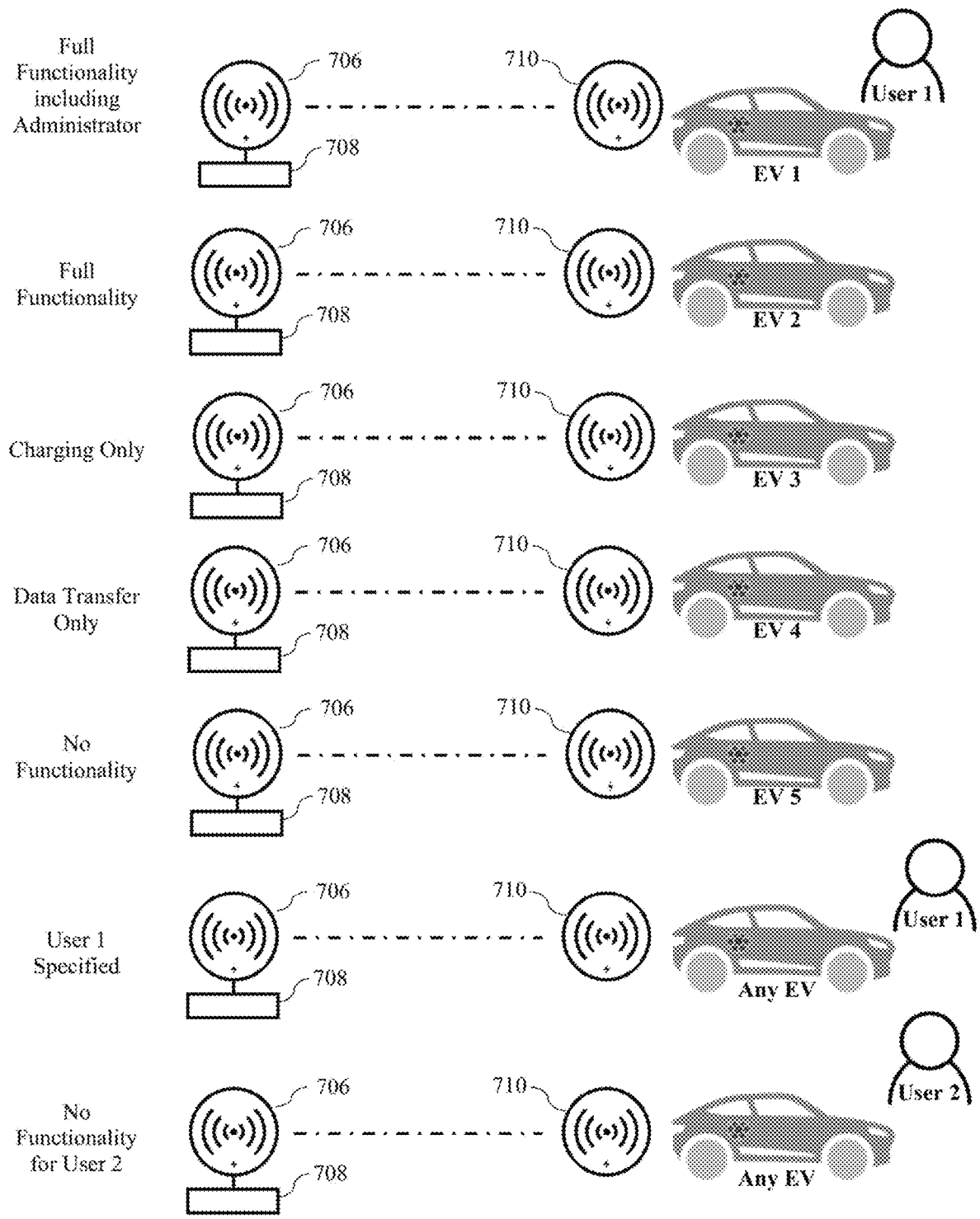
FIG. 9 is a functional diagram of various exemplary modes of operation within an electric vehicle charging system, in accordance with certain aspects of the present disclosure.

Referring now to FIG. 9, with cross-reference made to FIGS. 6 and 7, a functional diagram of various exemplary modes of operation within electric vehicle charging system 700 is shown. In accordance with certain aspects of the present disclosure, controller 708 may be communicably engaged with computing device 604 (as shown in FIG. 6) to configure one or more functions of power source resonator 706 and/or power capture resonator 710 according to a plurality of transfer permissions. In accordance with certain embodiments, a first set of transfer permissions for an administrative user may include enabling administrative controls for controller 708 and a full functionality of power source resonator 706 and power capture resonator 710 for a first electric vehicle configured as an administrator vehicle. Another set of transfer permissions may include enabling a full functionality of power source resonator 706 and power capture resonator 710 for an electric vehicle configured as a non-administrator vehicle. Another set of transfer permissions may include enabling a charging-only function of power source resonator 706 and power capture resonator 710 for an electric vehicle configured as a non-administrator vehicle. Another set of transfer permissions may include enabling a data transfer-only function of power source resonator 706 and power capture resonator 710 for an electric vehicle configured as a non-administrator vehicle. Still another set of transfer permissions may include disabling all functions of power source resonator 706 and power capture resonator 710 for an electric vehicle configured as a non-administrator vehicle and/or an electric vehicle that has yet to be authenticated, failed authentication, or is otherwise unknown. Still another set of transfer permissions may include enabling administrative controls for controller 708 and a full functionality of power source resonator 706 and power capture resonator 710 for an electric vehicle where the driver of the electric vehicle is authenticated as the administrative user. Yet another set of transfer permissions may include disabling all functions of power source resonator 706 and power capture resonator 710 for an electric vehicle where the driver of the electric vehicle is unknown or is identified as a non-administrative user having restricted transfer permissions.

Figure 10:
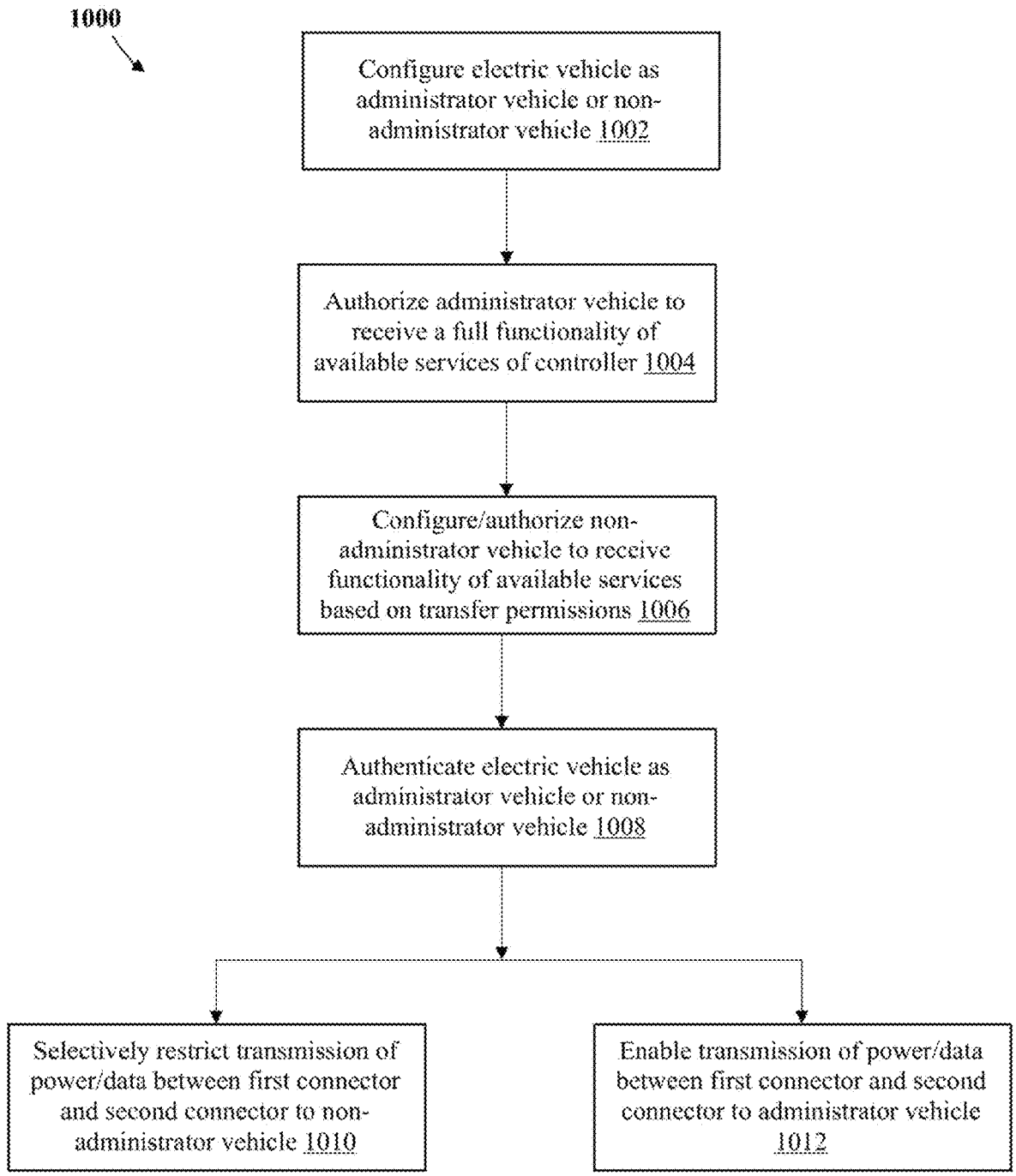
FIG. 10 is a process flow diagram of a method for configuring one or more control settings within an electric vehicle charging system, in accordance with certain aspects of the present disclosure.

Referring now to FIG. 10, a process flow diagram of a method 1000 for configuring transfer permissions within an electric vehicle charging system is shown. In accordance with certain aspects of the present disclosure, method 1000 may be configured as one or more routines or subroutines of an electric vehicle charging application executing on a computing device. The one or more routines may be operable to provide one or more communications between the computing device and the controller to configure one or more functions and/or operations of the controller. In certain embodiments, the one or more communications between the computing device and the controller may comprise one or more user-generated inputs from an administrator computing device associated with an administrative user of the electric vehicle charging application. In a specific embodiment, method 1000 may be initiated by configuring, in response to receiving the one or more user-generated inputs, an electric vehicle as an administrator vehicle (Step 1002). Method 1000 may proceed by authorizing the administrator vehicle to receive a full functionality of available services of the controller (Step 1004). In certain embodiments, the full functionality of available services comprises administrative rights. Method 1000 may proceed by configuring and authorizing a non-administrator vehicle to receive a functionality of available services of the controller based on one or more transfer permissions defining a selective transmission of power or data between a first connector and a second connector (Step 1006). In certain embodiments, the functionality of available services authorized for the non-administrator vehicle does not comprise the administrative rights. Method 1000 may proceed by authenticating the power source or the data source associated with the second connector (Step 1008). According to the outcome of Step 1008, method 1000 may proceed by selectively restricting or disabling the transmission of power and/or data between the first connector and the second connector to the non-administrator vehicle (Step 1010); or alternatively, enabling the transmission of power and/or data between the first connector and the second connector to the administrator vehicle (Step 1012).

In accordance with certain embodiments, method 1000 may be further configured to selectively configure a second or subsequent electric vehicle as the administrator vehicle in response to authenticating an administrative user as a driver of the second or subsequent electric vehicle. Method 1000 may be further configured to selectively configure a second or subsequent electric vehicle as the non-administrator vehicle wherein a non-administrative user is a driver of the second or subsequent electric vehicle. Method 1000 may be further configured to authenticate a driver of the electric vehicle as the administrative user of the user application, the administrative user having administrative rights to configure the one or more control settings of the controller.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrases are used herein, a processor may be "operable to" or "configured to" perform a certain function in a variety of ways, including, for example, by having one or more general-purpose circuits perform the function by executing particular computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising" "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. An electric vehicle charging system, comprising:
   a first connector configured to operably interface with an on-board charger of an electric vehicle to selectively deliver power and/or data to the electric vehicle;
   a second connector configured to selectively receive power and/or data from a power source and/or a data source; and,
   a controller operably engaged with the first connector and the second connector and configured to selectively control a flow of power and/or data between the first connector and the second connector, the controller comprising:
     a processor; and
     a non-transitory computer readable medium having stored thereon a set of instructions executable by the processor that, when executed, cause the processor to perform one or more operations, the one or more operations comprising:
       receiving a user-generated input from an administrator computing device associated with an administrative user of an electric vehicle charging application;
       configuring, in response to the user-generated input, the electric vehicle as an administrator vehicle;
       authorizing the administrator vehicle to receive a full functionality of available services of the controller, wherein the full functionality of available services comprises administrative rights;
       configuring and authorizing a non-administrator vehicle to receive a functionality of available services of the controller based on one or more transfer permissions defining a selective transmission of power or data between the first connector and the second connector, the one or more transfer permissions being configurable by the administrator computing device, wherein the functionality of available services authorized for the non-administrator vehicle does not comprise the administrative rights; and
       authenticating the power source or the data source associated with the second connector,
       wherein the controller is configured to disable the transmission of power and/or data between the first connector and the second connector to the non-administrator vehicle and enable the transmission of power and/or data between the first connector and the second connector to the administrator vehicle, in accordance with the one or more transfer permissions.

2. The system of claim 1 wherein the first connector comprises a power capture resonator.

3. The system of claim 2 wherein the second connector comprises a power source resonator.

4. The system of claim 1 wherein the administrator computing device comprises an onboard computer of the electric vehicle.

5. The system of claim 1 wherein the administrator computing device comprises a smart phone or a tablet computer.

6. The system of claim 1 wherein the administrator computing device comprises a remote server.

7. The system of claim 1 further comprising a wireline interface between the first connector and the second connector, the wireline interface being configured to enable the flow of power and/or data between the first connector and the second connector.

8. The system of claim 1 wherein the one or more operations further comprise selectively configuring a second or subsequent electric vehicle as the administrator vehicle in response to authenticating the administrative user as a driver of the second or subsequent electric vehicle.

9. The system of claim 1 wherein the one or more operations further comprise selectively configuring a second or subsequent electric vehicle as the non-administrator vehicle wherein a non-administrative user is a driver of the second or subsequent electric vehicle.

10. An electric vehicle charging system, comprising:
    a first transfer interface comprising a power capture resonator operably engaged with an on-board charger of an electric vehicle, the first transfer interface being configured to wirelessly receive a power and/or data transmission;
    a second transfer interface comprising a power source resonator configured to selectively receive power and/or data from a power source and/or data source and wirelessly transmit a power and/or data transmission to the first transfer interface; and
    a controller communicably engaged with the first transfer interface and/or the second transfer interface and configured to enable or restrict one or more functions of the first transfer interface and/or the second transfer interface in response to one or more control settings, the controller comprising:
a processor; and
a non-transitory computer readable medium having stored thereon a set of instructions executable by the processor that, when executed, cause the processor to perform one or more operations, the one or more operations comprising:
receiving, via an input-output device communicably engaged with the controller, a user-generated input associated with an administrative user of an electric vehicle charging application;
configuring, in response to the user-generated input, the electric vehicle as an administrator vehicle;
authorizing the administrator vehicle to receive a full functionality of available services of the controller, wherein the full functionality of available services comprises administrative rights; and
configuring and authorizing a non-administrator vehicle to receive a functionality of available services of the controller based on one or more transfer permissions defining a selective transmission of power and/or data between the first transfer interface and the second transfer interface, the one or more transfer permissions being configurable by an administrator computing device, wherein the functionality of available services authorized for the non-administrator vehicle does not comprise the administrative rights;
wherein the controller is configured to restrict the transmission of power and/or data to the non-administrator vehicle and enable the transmission of power and/or data to the administrator vehicle, in accordance with the one or more transfer permissions.

11. The system of claim 10 wherein the one or more operations further comprise authenticating a driver of the electric vehicle as the administrative user of the electric vehicle charging application, the administrative user having administrative rights to configure the one or more control settings of the controller.

12. The system of claim 10 wherein the administrator computing device comprises an onboard computer of the electric vehicle.

13. The system of claim 11 wherein the one or more operations further comprise selectively configuring a second or subsequent electric vehicle as the administrator vehicle in response to authenticating a driver of the second or subsequent electric vehicle as the administrative user.

14. The system of claim 10 wherein the one or more operations further comprise authenticating a driver of the electric vehicle as the non-administrative user.

15. The system of claim 10 wherein the second transfer interface is configured to receive a user identification communication from the first transfer interface and authenticate the electric vehicle as the administrator vehicle or the non-administrator vehicle.

16. The system of claim 15 wherein the second transfer interface is configured to disable the flow of data and power to the first transfer interface in response to failing to authenticate the electric vehicle.

17. An electric vehicle charging system, comprising:
a first connector configured to selectively deliver power and/or data to an electric vehicle;
a second connector configured to selectively receive power and/or data from a power source and/or a data source and deliver the power and/or data to the first connector via at least one transfer interface;
a controller operably engaged with the first connector or the second connector and configured to selectively control a flow of power and/or data between the first connector and the second connector according to one or more control settings; and
a computing device communicably engaged with the controller to selectively configure the one or more control settings via a user application executing on the computing device, wherein the one or more control settings comprise:
configuring the electric vehicle as an administrator vehicle or a non-administrator vehicle;
authorizing the administrator vehicle to receive a full functionality of available services of the controller, wherein the full functionality of available services comprises administrative rights;
configuring and authorizing the non-administrator vehicle to receive a functionality of available services of the controller based on one or more transfer permissions defining a selective transmission of power or data between the first connector and the second connector, wherein the functionality of available services authorized for the non-administrator vehicle does not comprise the administrative rights; and
authenticating the electric vehicle as the administrator vehicle or the non-administrator vehicle,
wherein the controller is configured to selectively restrict the transmission of power and/or data between the first connector and the second connector to the non-administrator vehicle and enable the transmission of power and/or data between the first connector and the second connector to the administrator vehicle, in accordance with the one or more transfer permissions.

18. The system of claim 17 wherein the user application is configured to authenticate a driver of the electric vehicle as the administrative user of the user application, the administrative user having administrative rights to configure the one or more control settings of the controller.

19. The system of claim 18 wherein the computing device comprises an onboard computer of the electric vehicle.

20. The system of claim 19 wherein the user application is configured to configure a second or subsequent electric vehicle as the administrator vehicle in response to authenticating a driver of the second or subsequent electric vehicle as the administrative user of the user application.

* * * * *